United States Patent [19]

Haines

[11] Patent Number: 4,842,034

[45] Date of Patent: * Jun. 27, 1989

[54] WINDOW SHADE

[75] Inventor: Richard K. Haines, Elkhart, Ind.

[73] Assignee: Elkhart Door, Incorporated, Elkhart, Ind.

[*] Notice: The portion of the term of this patent subsequent to Mar. 29, 2005 has been disclaimed.

[21] Appl. No.: 159,230

[22] Filed: Feb. 23, 1988

Related U.S. Application Data

[60] Division of Ser. No. 854,158, Apr. 21, 1986, and a continuation-in-part of Ser. No. 785,800, Oct. 9, 1985, Pat. No. 4,733,710.

[51] Int. Cl.$^4$ ............................................... E06B 3/94
[52] U.S. Cl. ....................................... 160/84.1; 160/87
[58] Field of Search ..................... 160/84.1, 115, 116, 160/169, 172, 178, 107, 87

[56] References Cited

U.S. PATENT DOCUMENTS 4,733,710 3/1988 Haines ............................. 160/279 X

FOREIGN PATENT DOCUMENTS 61284 9/1943 Denmark ........................... 160/84.1

Primary Examiner—Blair M. Johnson
Attorney, Agent, or Firm—Richard Bushnell

[57] ABSTRACT

A window shade construction comprises a first pleated shade member having one end thereof coupled to a first header and a second pleated shade member having one end thereof coupled to an opposite end of the first shade member. Cords are operatively coupled to the header and to the first and second shade members for selectively moving either or both of the first and second shade members between a fully collapsed position and a fully extended position relative to the window frame.

5 Claims, 5 Drawing Sheets

U.S. Patent  Jun. 27, 1989  Sheet 1 of 5  4,842,034
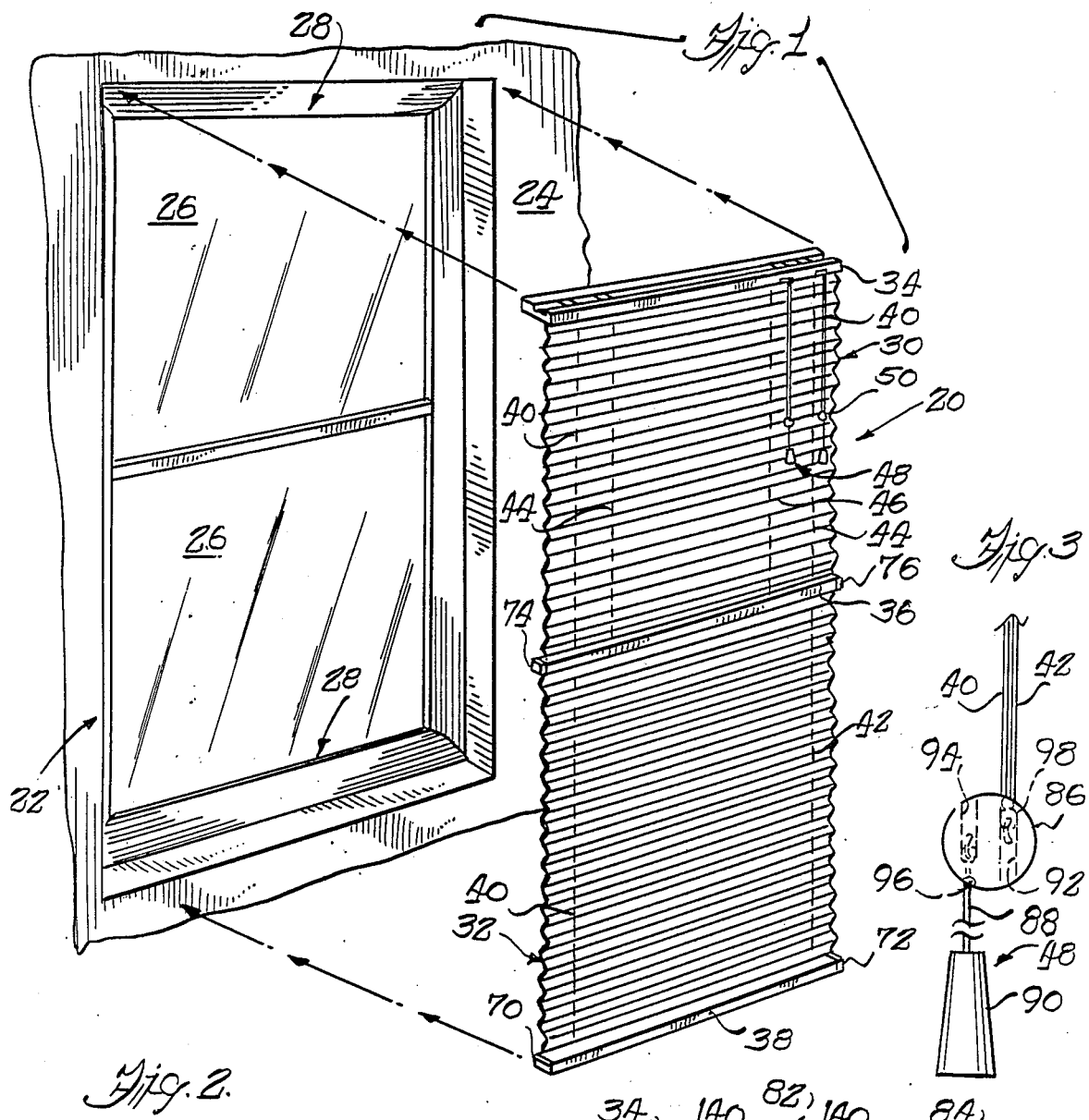
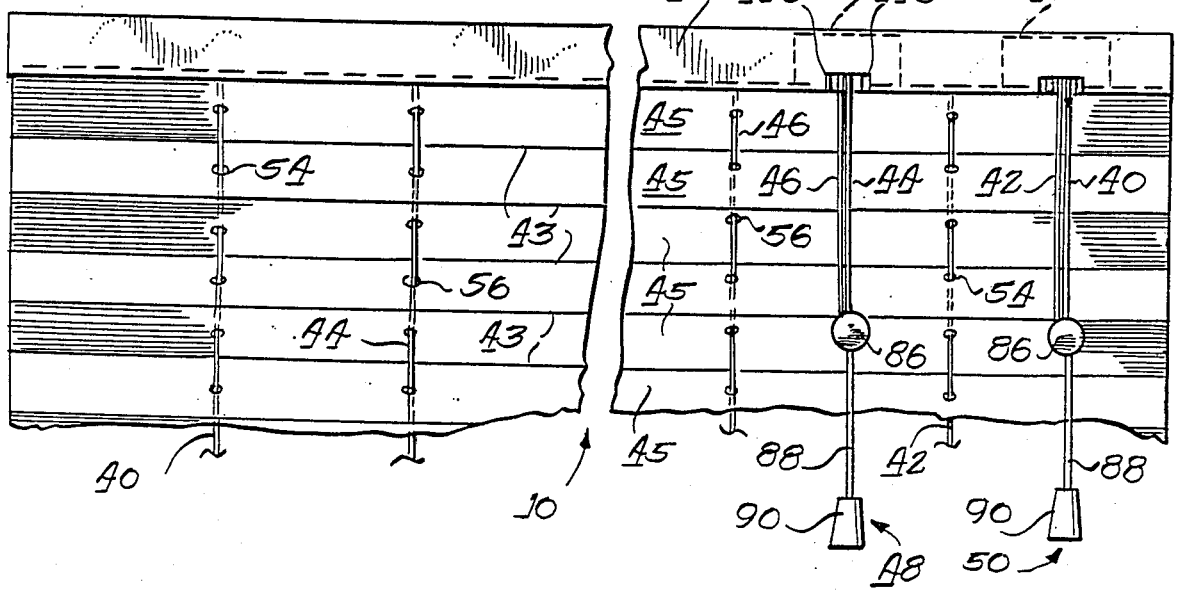

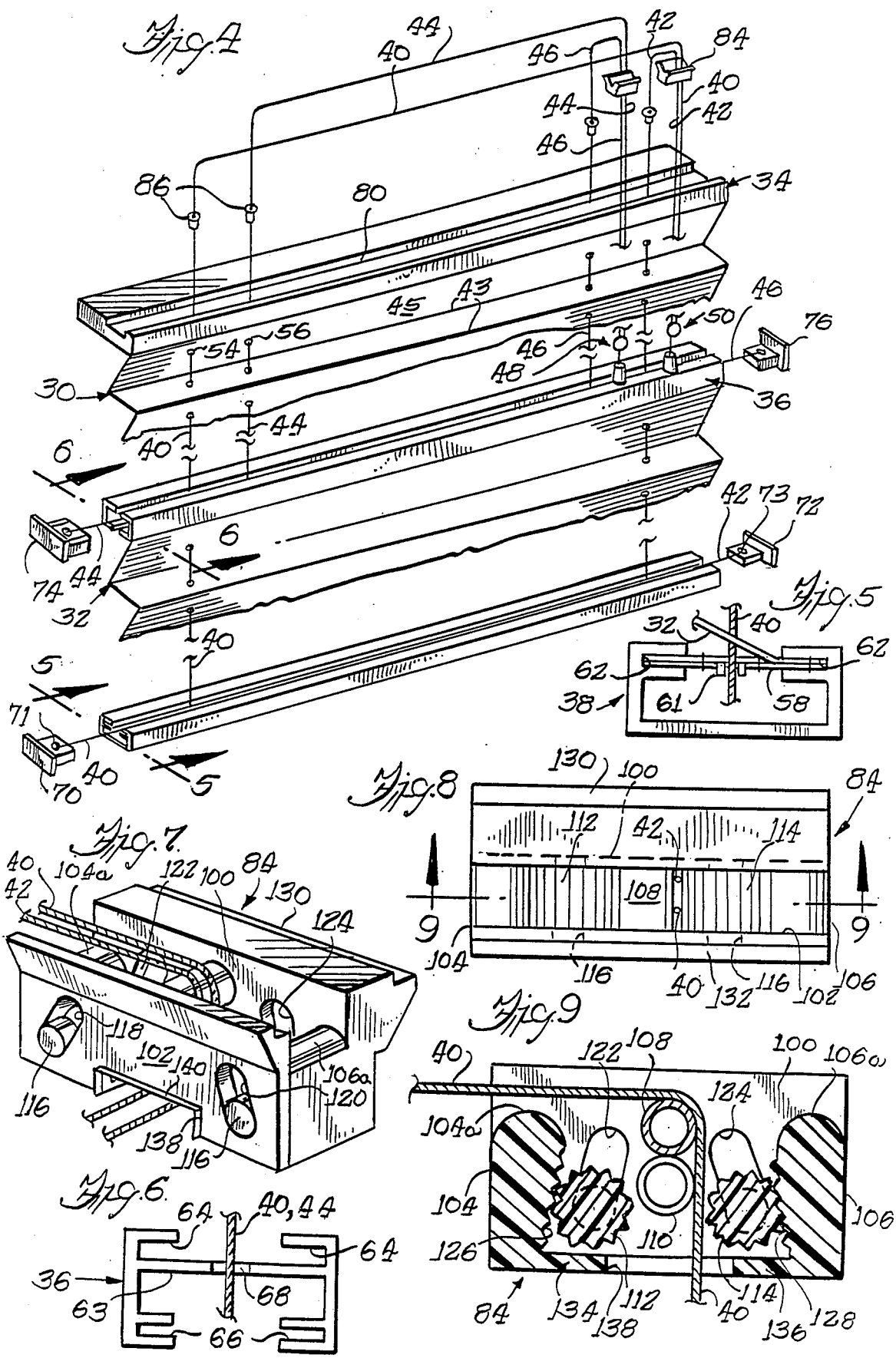

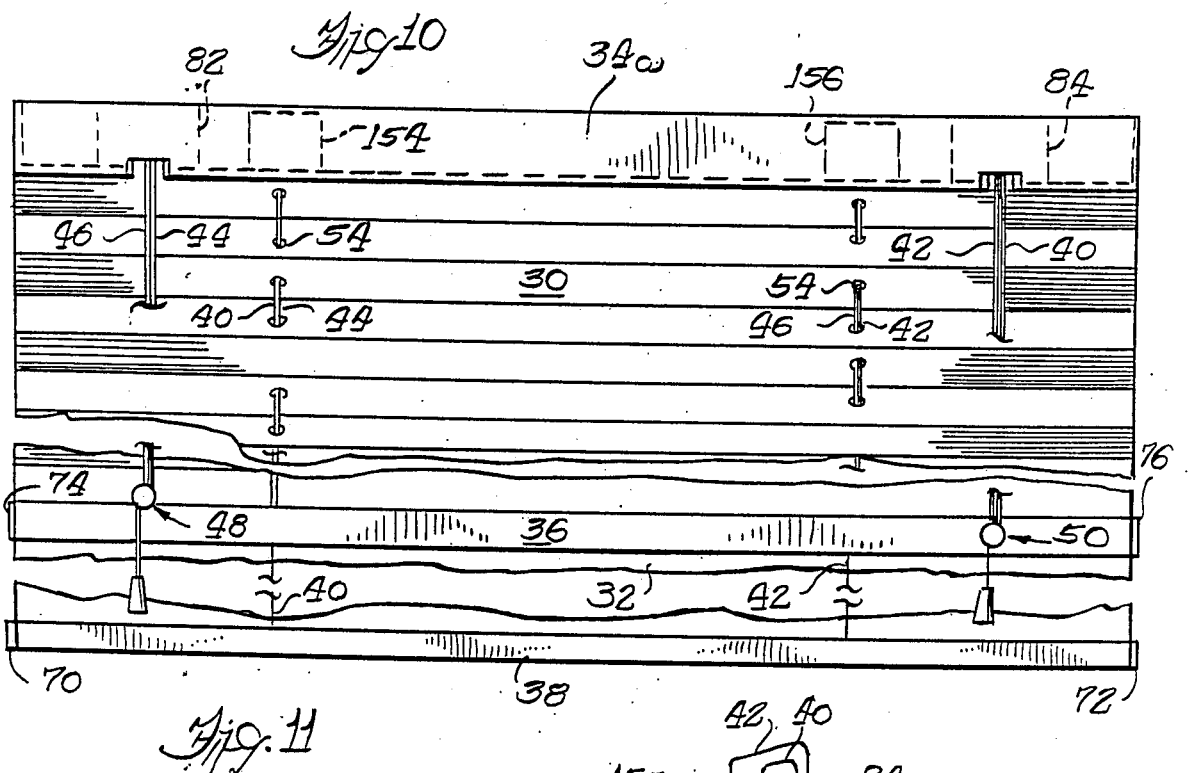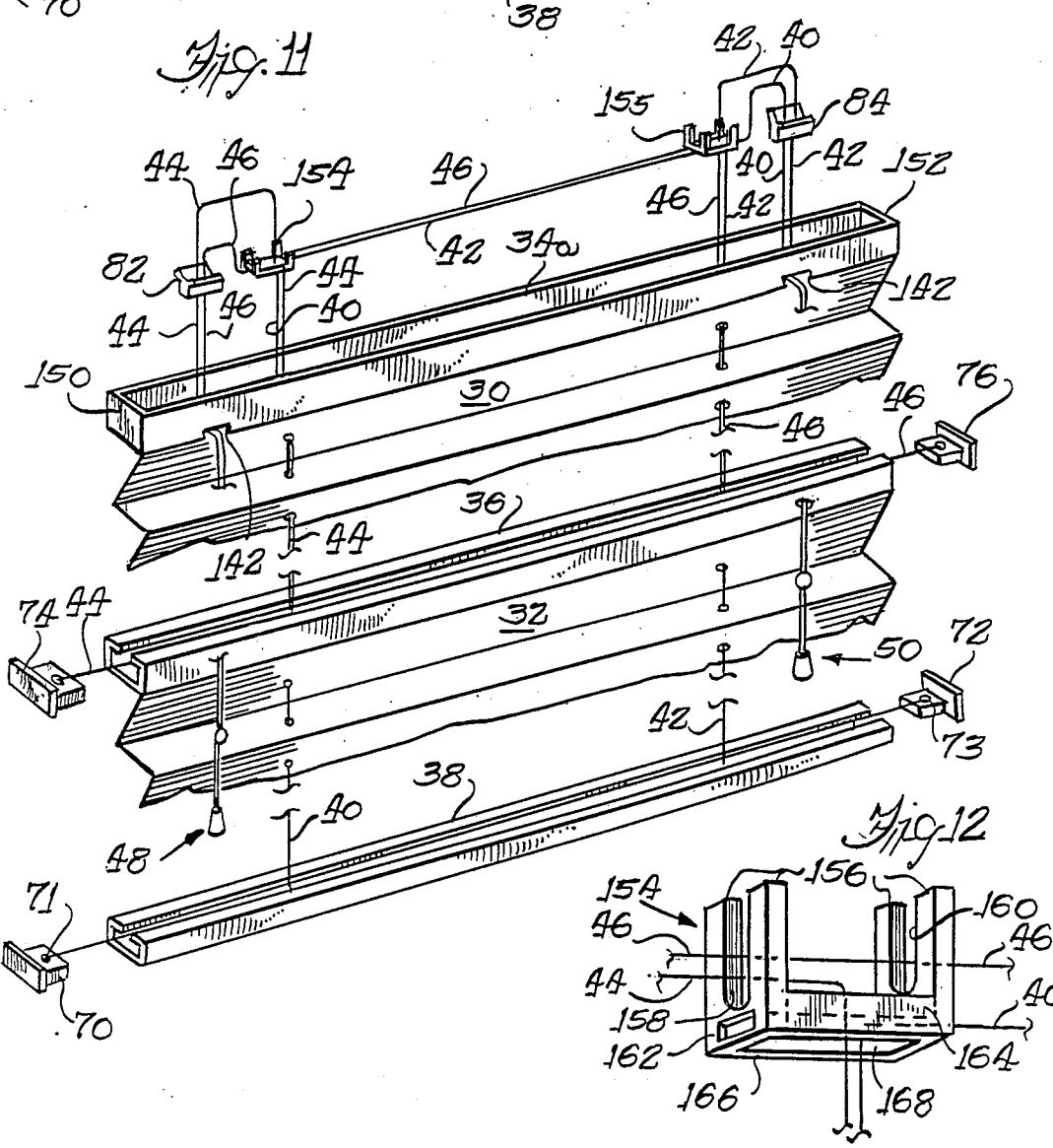

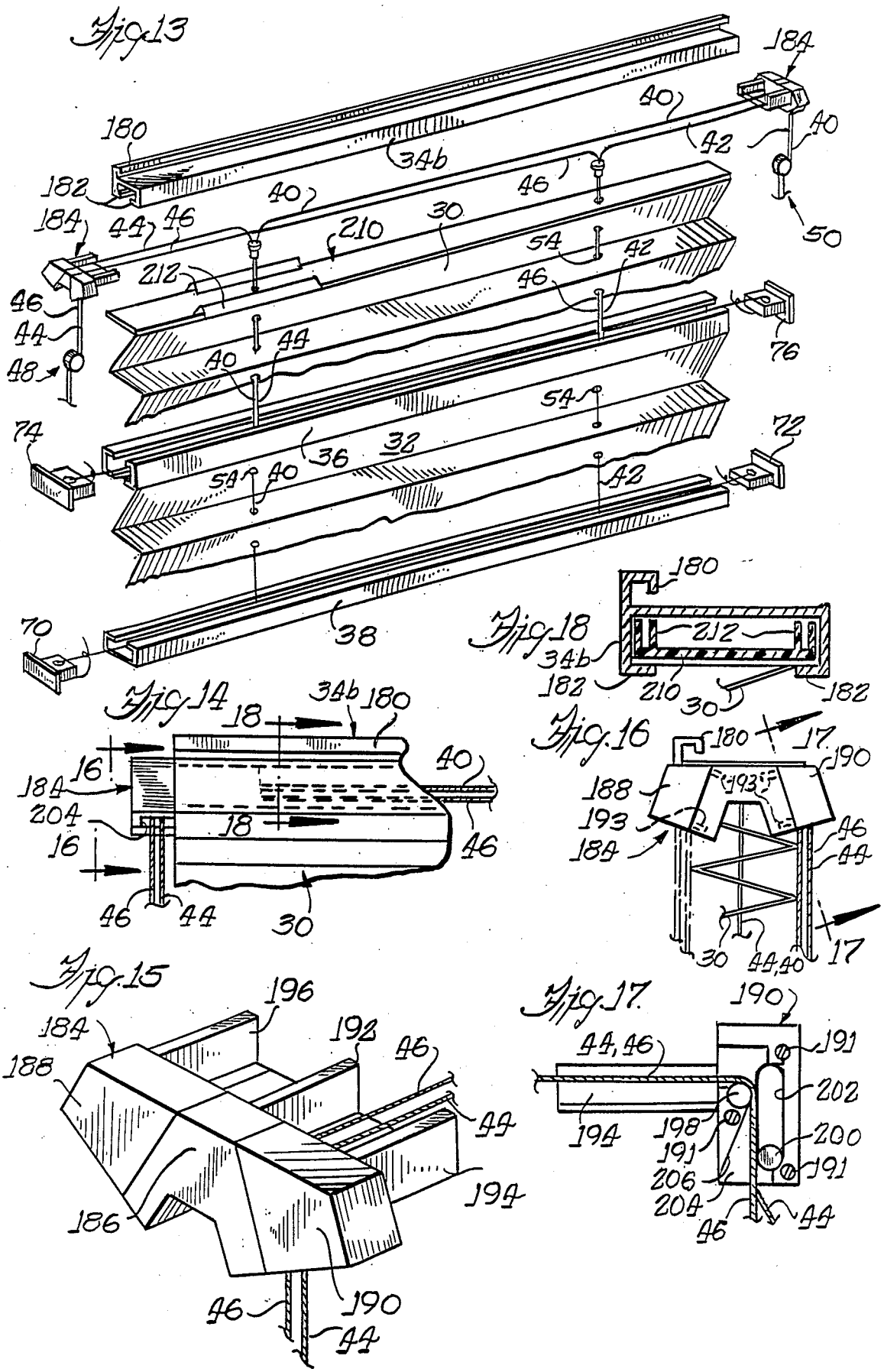

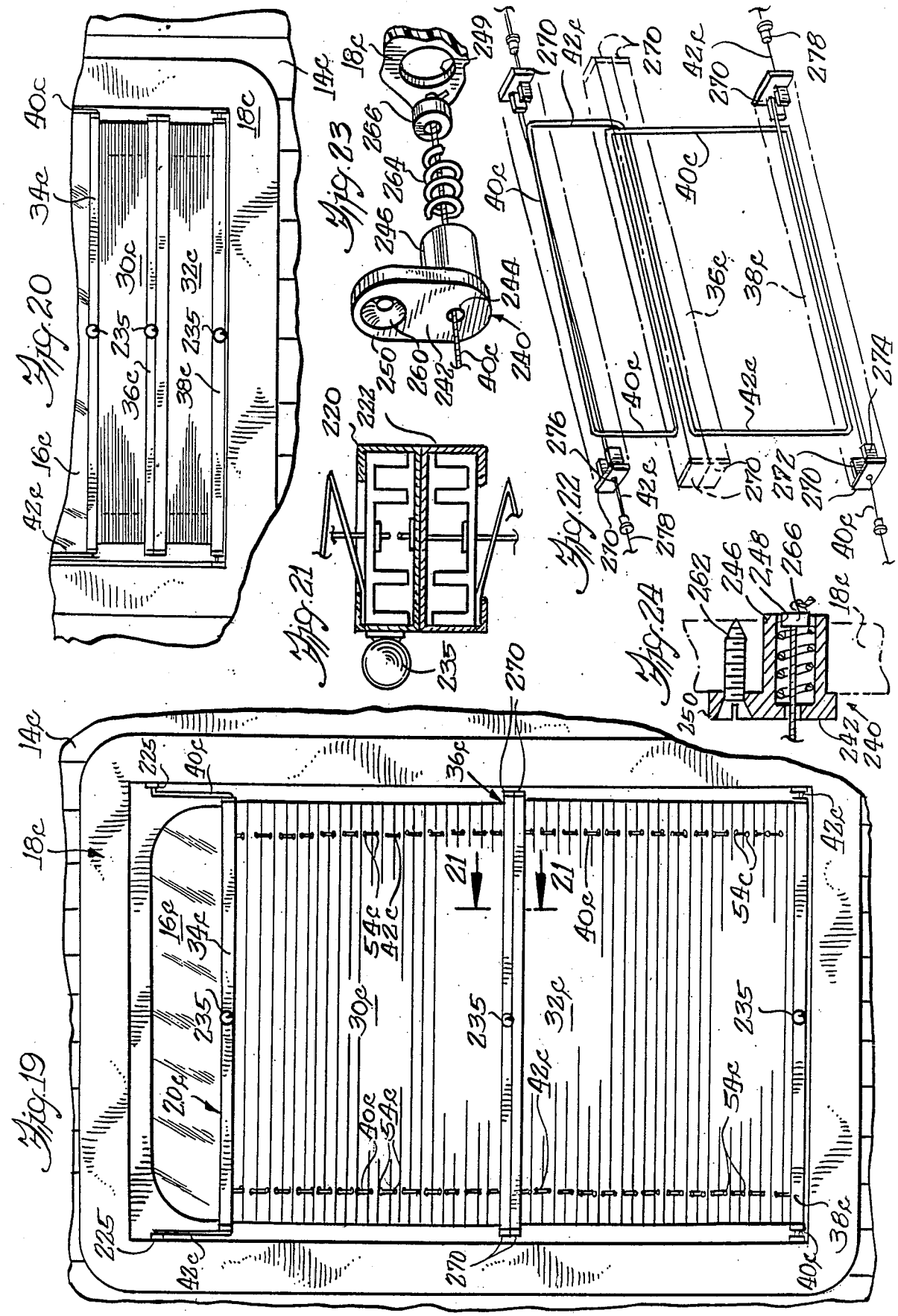

4,842,034

WINDOW SHADE

CROSS-REFERENCE TO RELATED APPLICATION

This is a divisional of co-pending application Ser. No. 854,158 filed of 4/21/86 and a continuation-in-part of my earlier application, Ser. No. 785,800, filed Oct. 9, 1985 now U.S. Pat. No. 4,733,710.

BACKGROUND OF THE INVENTION

This invention relates generally to window shades and more particularly to a window shade construction for mounting a window within a window frame unit for use as a day/night type shade, for example, in a home or in a vehicle such as a van.

The prior art has proposed a number of venetian blind-type window coverings including ones for use in vehicular or van windows. Such venetian blind constructions are shown for example in my prior U.S. Pat. Nos. 4,444,239 and 4,506,476. These prior U.S. patents illustrate venetian blind assemblies which are attachable respectively to a window frame and directly to the glass or other transparent member of the window itself. In the latter case, the window may be hingedly mounted for opening and closing relative to the fixed frame and surrounding wall, whereby the window blind attached thereto moves with the window.

The present invention provides a shade-type of window covering as an alternative to the venetian blind-type of window covering. However, it will be appreciated that some of the same considerations as to mounting relative to a window or window frame, are applicable to such a shade type of structure as well.

It is also often desirable when using window shades to provide for continuously variable positioning of the shade relative to the window. That is, the shade preferably should be movable to positions respectively substantially fully covering the window and fully exposing the window and also adjustable to any desired position therebetween. Moreover, it is often desirable to provide a translucent type of shade for daytime use for permitting outside light to enter while preventing visual observation of the interior of the home or vehicle from the outside. On the other hand, for nighttime use, it is desirable to utilize opaque shades for preventing viewing of a lighted interior.

OBJECTS AND SUMMARY OF THE INVENTION

Accordingly, it is a general object of the invention to provide a novel and improved window shade construction suitable for use in a home or in a vehicle such as a van.

A related object is to provide a window shade construction in accordance with the foregoing object which is continuously variably positionable between positions for respectively substantially fully covering and fully exposing the window.

A further related object is to provide a window shade construction in accordance with the foregoing objects which permits selectively extendable and collapsible translucent and opaque portions for respective daytime and nighttime use.

Briefly, and in accordance with the foregoing objects, a shade construction in accordance with the invention comprises a first pleated shade member having one end thereof coupled to a window frame; a second pleated shade member having one end thereof coupled to an opposite end of said first shade member; cord means operatively coupled to said first and second shade members; and control means operatively coupled with said cord means for selectively moving either or both of said first and second shade members between a fully collapsed position and a fully extended position relative to said window frame.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in the several figures of which like reference numerals identify like elements, and in which:

FIG. 1 is an exploded perspective view, illustrating a window frame and an associated window shade construction in accordance with the invention;

FIG. 2 is an enlarged partial elevational view of a top portion of the window shade of FIG. 1;

FIG. 3 is a further enlarged partial elevational view showing details of a cord pull portion of the window shade construction of FIG. 1;

FIG. 4 is a partially exploded perspective view illustrating assembly of some of the parts of the shade construction of FIGS. 1-3;

FIG. 5 is an enlarged sectional view taken generally along the line 5—5 of FIG. 4;

FIG. 6 an enlarged sectional view taken generally along the line 6—6 of FIG. 4;

FIG. 7 an enlarged perspective view of a releasably locking cord guide portion of the window shade construction of FIGS. 1-4;

FIG. 8 top plan view of the cord guide of FIG. 7;

FIG. 9 is a sectional view taken generally along the line 9—9 of FIG. 8;

FIG. 10 is a partially broken-away front plan view of a shade construction in accordance with a second embodiment of the invention FIG. 11 is a partially exploded, partially broken-away perspective view of the shade construction of FIG. 10;

FIG. 12 is an enlarged side elevation of a cord guide member of the embodiment of FIGS. 10 and 11 illustrating further details thereof in connection with a number of cords being guided thereby;

FIG. 13 is a partially exploded, partially broken-away perspective view, similar to FIGS. 4 and 11, illustrating a window shade construction in accordance with a third embodiment of the invention;

FIG. 14 an enlarged partial plan view illustrating an upper corner portion of the assembled construction of FIG. 13;

FIG. 15 is a further enlarged perspective view illustrating a cord guide member of the embodiment of FIGS. 13 and 14;

FIG. 16 is a partial end view taken along the line 16—16 of FIG. 14;

FIG. 17 is an enlarged sectional view taken generally along the line 17—17 of FIG. 16;

FIG. 18 is a sectional view taken generally in the plane of the 18—18 in FIG. 14;

FIG. 19 is a plan view of a window shade construction in accordance with yet another embodiment of the invention, configured for use in a van or similar vehicle;

FIG. 20 is a partial plan view, similar to FIG. 18 illustrating the operation of the window shade thereof;

FIG. 21 is an enlarged partial sectional view taken generally in the plane of the line 21—21 of FIG. 19;

FIG. 22 is a somewhat diagramatic view illustrating the routing cords in the shade construction of FIGS. 19 and 20;

FIG. 23 is a fragmentary exploded perspective view showing one form of attachment member for attaching respective cord ends in the embodiment of FIGS. 19 and 20 to a window frame; and FIG. 24 is an axial section through an assembled attachment member of the type shown in FIG. 23.

DETAILED DESCRIPTION OF THE ILLUSTRATED EMBODIMENT

Referring now to the drawings, and initially to FIGS. 1 through 9, a window shade construction in accordance with the invention is indicated generally by the reference numeral 20. This window shade construction 20 is suitable for use with a more-or-less conventional window 22, which includes one or more glazed panels 26 in a frame 28, set into a wall 24. In accordance with the invention, the window shade includes a pair of similar pleated shade members 30 and 32 which are coupled intermediate respective top, middle or intermediate, and bottom header members 34, 36 and 38. In accordance with a preferred form of the invention, these pleated shade members 30 and 32 may be respective "day" and "night" shades, that is, one may be transparent and one opaque for respective daytime and nighttime use. In this regard, as will be more fully explained hereinbelow, either of shades 30, 32 is capable of being fully extended or fully retracted relative to the window 22 by the remaining shade structure to be described hereinbelow.

In this regard, the shade structure 20 further includes a pair of elongate, flexible cord members 40, 42 which extend the full length of the shade construction from top header 34 to bottom header 38. An additional pair of cords 44, 46 are located generally inboard of cords 40 and 42 and extend only from top header 34 to middle header 36. As will be more fully described hereinbelow, the respective cords 40, 42 and 44, 46 are brought out to selectively operable cord pull means or assemblies 48, 50, which in the embodiment of FIGS. 1 through 7 are both located generally to one lateral side of the shade construction. These cord pull assemblies 48 and 50 may be alternatively pulled and released to raise and lower either or both of headers 36 and 38, to thereby correspondingly extend and collapse the associated one or ones of pleated shade members 30, 32.

Referring briefly to the pleated shade members 30, 32, it will be seen that each comprises an accordion-pleated shade member, that is one having a plurality of folds 43 extending in alternating opposite directions at substantially equal intervals therealong. Hence, respective pleats or shade segments 45 of substantially equal dimensions are defined between respective adjacent folds 43. The respective upper and lower ends of each of pleated shade members 30 and 32 may be adhesively or mechanically affixed by gluing, stapling or otherwise to the respective headers. However, in the illustrated embodiment, referring to FIGS. 5 and 6, the middle and bottom headers 36 and 38 preferably comprise elongate, preferably extruded, channel members. Each of these channels defines respective narrow undercut channel or flange portions 62 and 64, 66 at shade-facing surfaces thereof for receiving and grippingly engaging end parts of the respective pleated shades therein. In this regard, additional elongate mounting strips 58 are also preferably provided, to which the ends of the shades are secured, preferably by adhesive means. These mounting strips are in turn slidably inserted into these flanges or channel portions 62 and 64, 66 so as to assure secure engagement of end portions of the respective pleated shade members with respect to the respective channels. Strips 58 are also provided with suitable through apertures 61 for passage of the cords therethrough.

Channel 36 has an interior web or wall 68 which has through apertures which receive suitable, preferably plastic grommets 63 for guiding each of respective cords 40, 42 and 44, 46 therethrough. While cords 40 and 42 extend through respective grommets 63 so as to extend through bottom pleated shade 32 to bottom header 38, cords 44 and 46 are brought out to either side to be tied off at respective end caps 74 and 76. Advantageously, the channel-like header members 36 and 38 may be continuously formed, as by an extruding process from an aluminum or similar material and cut to form headers of the desired length.

Each of the pleated shades also includes a plurality of aligned, cord-receiving through apertures 54, 56 in each of respective segments 45 thereof. These through apertures thus movably or slidably mount the pleated shade members with respect to the cords. Only the aligned through apertures 54 are provided in pleated shade 30, to receive only cords 40, 42 therethrough, as cords 44, 46 terminate at middle header 36.

End caps 70, 72 and 74, 76 are provided for closing off the respective open ends of these hollow elongate headers 36 and 38. Each of these end caps is further provided with a reduced cross-section inwardly extending tab portion 71 through which is formed a through aperture 73 to receive an end of a respective one of the cords 40, 42 and 44, 46 tied off thereat, as illustrated in FIG. 4.

Referring now more particularly to the top header 34, in the embodiment of FIGS. 1 through 9, header 34 is made from wood. However, it will be appreciated that this header 34 may be formed from any desired material without departing from the invention. As best viewed in FIG. 4, the header 34 has an elongate recess or channel 80 running the entire length of an upper surface thereof. Respective cord guide and releasable cord locking members 82 and 84 are configured to be recessed or received into this recess or channel 80. In order to receive and guide the cords 40, 42 and 44, 46 through the top header 34, the channel 80 is provided with a plurality of through apertures (not shown) into which are preferably placed respective similar grommets 86, preferably of a plastic material, to receive and guide the cords therethrough while minimizing abrasion thereof.

The details of the cord pull assemblies 48, 50 are illustrated in FIG. 3. Therein it will be seen that each of the pairs of cords 40, 42 and 44, 46 are tied off at one end of a generally circular disc or disc-like coupling member 86. Similarly, a single pull cord 88 terminating in a gripping knob 90 is also coupled to each disc 86. To this end, each disc 86 preferably has a pair of similar, oppositely facing enlarged bores 92, 94 which extend part way therethrough from opposite sides thereof, and a pair of relatively smaller bores 96, 98, which extend from innermost ends of enlarged bores 92 and 94 through to the opposite end of the disc 86 respectively. Hence, the cords 40, 42 for example may be extended through bores 98 and 92 and their ends tied off or knotted so as to prevent retraction thereof back through smaller bore 98. Similarly, each cord 88 is extended through bore 96 and into bore 94 and its end tied off or knotted to prevent withdrawal thereof back through smaller bore 96.

Referring next to FIGS. 7 through 9, details of the guide and releasable cord locking means or devices 82, 84 are illustrated. As these devices are identical only the one device 82 is shown and described in detail, it being understood that the device 84 is substantially identical.

The cord guide and releasable locking means or assembly 84 comprises a generally rectilinear body having a generally hollow interior defined between opposing elongate side walls 100, 102. Respective end walls 104 and 106 join the side walls at opposite lateral ends thereof. A pair of similar, generally cylindrical centrally located, upper and lower guide pin members 108, 110 also extend transversely between and joining the walls 100 and 102. Cords 40 and 42 are also shown in FIGS. 7 and 9 extending over and around these guide posts 108, 110. A pair of releasably locking, and preferably serrated, toothed or gear-like wheel members 112 and 114 are symmetrically located to either side of central guide posts 108, 110. While only the one locking wheel 114 comes into play with respect to cords 40, 42, it will be recognized that the symmetrical arrangement permits the same locking assembly 84 to be utilized for strings entering from either, or indeed from both lateral sides thereof. In this regard, it will be noted that the uppermost edges of side walls 104, 106 are recessed somewhat below the uppermost extent of upper guide post and also side walls 100, 102. These walls 104, 106 include rounded or curved upper surface portions 104a, 106a to facilitate the guiding of strings thereover substantially without snagging or abrasion thereof.

The locking wheel members 112, 114 have oppositely outwardly extending shaft stub portions 116, 117 which are in turn slidably and rotatably mounted to respective pairs of elongate mounting slots 118, 120 and 122, 124 formed in respective side walls 100, 102. These respective pairs of slots 118, 120 and 122, 124 are also respectively aligned and also formed at symmetrical angles in the respective side walls so as to converge generally upwardly and inwardly about guide posts 108, 110. Hence, as the respective locking wheels 112, 114 travel upwardly and inwardly in their respective mounting slots, they tend to come into engagement with and lock the respective cords 40, 42 against one or both of the guide posts 108, 110. Cooperatively in this regard, the inwardly facing wall surfaces of end walls 104 and 106 have complementary serrations or racks 126, 128, formed thereon for engagement with the teeth of respective wheels 112 and 114. Accordingly, in response to slight upward and outward movement of either or both of cords 42, 44, frictional engagement with the toothed wheel 114 will cause the wheel 114 to ride upwardly along its facing rack 128 until it lockingly engages the cords 40 and 42 against post 108.

The opposite lateral side wall surfaces 100, 102 also terminate at their upper edges in generally outwardly extending mounting flange portions 130, 132, which are formed for complementary engagement with a form of header somewhat different from header 34, to be described later herein. Additionally, respective end walls 104, 106 also have respective inwardly projecting extension or bottom wall portions 134, 136 formed generally at right angles thereto which form partial bottom walls of the rectilinear member 84. These latter walls 134, 136 are also spaced apart at their innermost ends to define a through central bottom opening 138. As best viewed in FIG. 7, this central opening 138 also meets a U-shaped cutout 142 in side wall 102, which is preferably provided with a slight outwardly extending flange 140. This flange 140 is configured for interfitting with a through opening 142 provided therefore in header 34, thus positioning the guide and locking member or device 84 in the desired orientation relative to through opening 142.

Referring now to FIGS. 10 through 12, a window shade construction 20a in accordance with a second embodiment of the invention is illustrated. In many respects the structure of the window shade of FIGS. 10 through 12 is substantially identical with that already described. Accordingly, like reference numerals refer to like parts therein. However, it will be noted that the structure of FIGS. 10 through 12 employs a top header of somewhat different construction, designated by reference numeral 34a. This header 34a is preferably formed from a metallic material and comprises an elongate, generally U-shaped member. A pair of end closure or cap members 150, 152 are provided for opposite open ends of elongate header 34a. This header 34a also has through apertures 140 in its bottommost portion for receiving respective cords therethrough.

In this regard, the arrangement of respective cords 40, 42 and 44, 46 for control of the respective shade members 30 and 32 is similar to that shown and described above. However, in the embodiment of FIGS. 10–12, but a single set of apertures 54 are provided in the respective pleated shade members, each of sufficient size to receive two of the cords therethrough. Releasable cord locking assemblies 82 and 84 substantially identical to assembly 84 described above are also provided. However, in the embodiment of FIGS. 10 and 11, these assemblies and receiving apertures 140 therefor in header 34a are located at opposite lateral ends or sides of header 34a. Accordingly, the respective cord pull assemblies 48, 50 which are substantially identical to those shown and described in FIG. 3 are located generally to opposite lateral side edges of the shade assembly.

Additional cord guide members 154, 155 are also provided in the shade construction of FIGS. 10 and 11 for guiding the respective cords intermediate the respective locking assemblies 82, 84 and the through apertures 54 in pleated shade 30. One of these guide members 154 is shown in additional detail in FIG. 12, it being understood that guide member 155 is identical thereto. Guide member 154 is generally rectilinear in form including four, symmetrically arranged upstanding corner leg members 156. These leg members 156 generally define at opposite lateral sides generally U-shaped openings 158, 160 for receiving respective cords therethrough in a generally frictionless, non-abrading fashion from either side, as indicated in phantom line. Additional lower through openings 162 are also provided spaced slightly below the bottom of U-shaped openings 158 and 160 for retaining cords therein as they are guided therethrough, if desired. The two generally U-shaped side members defined by the upstanding legs 156 and openings 158, 160 are joined by respective opposite lateral walls 164, 166. This defines a generally rectilinear through bottom opening 168 through which the cords may extend downwardly and through suitable aligned openings (not shown) in header 34a so as to extend therethrough and into the apertures 54 in the shade 30.

In all other respects, the structure of the shade construction of FIGS. 10 through 12 is substantially identical with that described above with reference to FIGS. 1 through 9.

Referring next to FIGS. 13 through 18, a window shade construction 20b in accordance with yet a further embodiment of the invention is substantially similar in many respects to those constructions shown and described above. Accordingly, like reference numerals are utilized to designate like parts of the shade construction in FIG. 13. However, in the embodiment of FIG. 13 yet a different form of upper or top header is utilized, and is designated by reference numeral 34b. This top header 34b is channel-like in form, substantially similar to the channels utilized for middle and bottom headers described above with reference to FIGS. 5 and 6. However, the channel forming upper header 34b has but a single inwardly extending upper or top most flange portion 180, configured so as to generally interfit with a complementary gripping part of an overhead mounting device or arrangement (not shown) so as to suspend the shade with respect to a window. This mounting flange 180 is also shown in FIGS. 14, 16 and 18.

Respective lower, symmetrically inwardly extending flanges 182, 183 are configured to accommodate, preferably by a press fit, a combined end cap and cord guide and locking means or assembly designated generally by reference numeral 184. One such assembly 184 is provided at either outer end of upper header or channel 34b. These end assemblies 184 each comprises a composite member constructed of three pieces including a middle piece or base member 186 and two substantially identical but oppositely arranged or "mirror image" side pieces 188 and 190. These pieces 186, 188, 190 are initially assembled and held in alignment by aligned pins and slots 191, 193 preferably integrally formed thereon. The middle or base member 186 includes a generally inverted T-shaped channel portion 192 which interfits with respective complementary L-shaped channels 194, 196 on respective outer or side pieces 188 and 190 to define two generally U-shaped guide channels for guiding cords into engagement with one or both of the end members 188, 190. The outer surfaces of these channels are pressed into the open ends of channel-like header 34c to thereby hold pieces 186, 188 and 190 together, as aligned by pins 191 and receiving slots 193.

As best viewed in FIG. 17, side piece 190 has a hollow interior portion which mounts a first, fixed guide post or pin member 198 and a second, relatively movable guide pin or post member 200. The latter guide pin 200 is generally slidably movable in an elongate slot 202 provided therefor in end piece 190 and a complementary, aligned facing slot (not shown) provided in a facing surface of center or base member 186. As illustrated with respect to cord 40, one or two cords 40, 42 may be bent over and about fixed guide post 198 to extend through a bottom through opening 204 defined by the pieces 190 and 186.

Accordingly, upon some upward movement of the cords 40, 42 relative to the hollow interior of side piece 190, some outward pulling or pressure thereon will cause frictional engagement with slidable pin 200 so as to move the same upwardly in slot 202. It will be seen that upon a small amount of upward movement, pin 200 will come into position for pinching or grippingly engaging the cords 40 and 42 against fixed pin 198, thus providing a releasable locking feature. However, upon downward pulling on cords 40, 42, accompanied by some inward motion thereof, as permitted by a tilted or canted interior wall portion 206, the pin 200 will become released from pinching engagement of the cords against pin 198 and be free to return to a lower "disengaged" position in the slot 202 as illustrated in FIG. 17. It will be noted that the provision of substantially identical, mirror-image outer or side pieces 188, 190 permits the respective cords 40, 42 to be brought out to either side of the shade members 30, 32 as desired, as indicated by the additional cords shown in phantom line in ig. 16. Hence, an identical assembly 84 is used at the opposite end of header 34, with the cords directed through the "other" side piece 188 thereof so as to place all of the free cord ends on the same side of the shade construction.

Referring to FIG. 18, an additional shade mounting member 210 comprises a generally flat, elongate member slidably engageable between flanges 182, 183 and end wall or web 185 of top channel or header 34b. In the illustrated embodiment, this flat mounting piece 210 includes additional upwardly extending opposite lateral side abutment members or legs 212 which give it a generally channel-like form or appearance. These upstanding legs or members 212 may abut an inner surface of wall 185 so as to engage the uppermost fold of pleated shade 32 intermediate an undersurface of shade mounting member 210 and facing surfaces of flanges 182. The shade member may be additional affixed to mounting member 210 by adhesive or mechanical means, such as gluing, stapling or the like if desired.

In all other respects, the shade construction of FIG. 13 is substantially identical to the shade construction shown and described with reference to FIGS. 10 and 11.

Turning now to FIGS. 19 through 24, a window shade construction 20c in accordance with yet a further embodiment of the invention is illustrated. This latter window shade construction is particularly useful in connection with a window of a van or similar vehicle. This vehicle window 12c is formed in a vehicle wall 14c, and includes a generally rectangular transparent glazing panel 16c fitted to a receiving, generally rectangular frame member 18c. Details of the structure of this vehicle window 12c and frame 18c and glazing panel 16c, and its assembly with wall 14c are more fully set forth in my prior U.S. Pat. No. 4,444,239 to which reference is invited. The shade construction 20c utilizes a pair of flexible cords 40c and 42c which are attached at or near respective corners of the rectangular window frame 18c. In the illustrated embodiment respective grommets 225 are illustrated to receive ends of cords 40c and 42c therethrough. These ends may then be knotted off or otherwise provided with means to prevent their pulling back through grommets 225. Alternative forms of attachment of ends of the cords 40c and 42c with the window frame 18c are illustrated in FIGS. 23 and 24. In a vehicle such as a van, it is considered advantageous to slidably mount the shade construction to the flexible cords 40c and 42c, so as to avoid any loose, depending portions of the shade within the van or other vehicle. Hence, cords and 42c hold the shade in relatively close engagement with window 16c and within frame 18c.

Respective top, middle and bottom headers 34c, 36c and 38c may be respectively slidably mounted to cords 40c and 42c for slidable movement therealong. The details of this mounting are illustrated in FIG. 22. Preferably, some degree of frictional engagement is maintained between the cords 40c and 42c and the respective headers so that each of these headers may be positioned at any desired position relative to the window as generally illustrated in FIGS. 19 and 20. Alternatively, one or both of top and bottom headers 34c, 38c may be fixedly mounted to a topmost or bottommost portion of the window frame 18c, so as to permit relative slidable movement of only the others of the headers along the cords. Such an arrangement may be used so as to permit opening and closing of the shade relative to the window only from one of the top and bottom sides thereof, or to maintain one or the other shade (or portions of each) covering the window at all times.

In the embodiment of FIGS. 1g through 24, similar accordion pleated shade members to those described hereinabove are indicated generally by reference numerals 30c and 32c. These may include a transparent shade member and an opaque shade member, as discussed above, if desired.

Referring to FIG. 21, each of the top and bottom headers 34c, 38c is substantially identical in construction. Moreover, the middle header 36c preferably is constructed of a pair of substantially identical back-to-back header members which are also substantially the same in form as headers 32c and 34c. Hence, it will be recognized that the middle header 36c illustrated in cross-section in FIG. 21 is essentially constructed of two back-to-back members, each of which is substantially identical in its construction to the respective top and bottom headers 34c and 38c which hence need not be described in detail.

Referring now more closely to FIG. 21, it will be seen that header 34c as mentioned above is formed from a pair of oppositely facing, similar outer channel members 220 and 222. These channel members 220 and 222 have generally oppositely facing partially open wall portion through which the respective ends of shade members 30c and 32c are received. Respective inner channel members 224 and 226 are of substantially similar configuration to the shade mounting member 212 illustrated and described hereinabove in FIG. 18. Hence, respective end most pleats or segments of each shade 30c and 32c may be held between members 212 and facing flanges 225 of channels 220 and 221. If desired, these end pleats may be adhesively or mechanically secured to these inner channel members or shade mounting members 224 and 226 which are in turn slidably inserted within the outer or channel members 220 and 222.

These mounting or inner channel members are provided with suitable through apertures, which may receive further grommets 230 and 232 as illustrated to permit passage of respective cords 40c and 42c therethrough. Additionally, solid end walls or web portions of each of channels 220 and 222 have suitable through apertures for receiving additional grommets 234, also for receiving respective cords 40c, 42c therethrough.

Moreover, as best viewed in FIG. 22, the respective cords 40c and 42c are crossed over each other within the hollow bodies of each of the headers 34c, 36c and 38c, so as to encourage frictional engagement therebetween. Such frictional engagement is such as to permit slidable movement of each of these headers with respect to the cords 40c, 42c, but to encourage each header to remain fixed in the position last assumed, thereby resisting vehicle vibrations or the like which might tend to dislodge the shade from its intended position. Such crossing over of the cords may of course be omitted with respect to either or both of the top and bottom headers, in the case where either or both of these headers are to be non-movably affixed to one of the top and bottom edges of the window frame. In this regard, each of the headers may also be provided with a suitable knob 235 to accomplished movement thereof, as appropriate to which of the headers are fixed and which movable, as discussed above.

Referring finally to FIGS. 23 and 24, an alternative form of the grommet 225 or a fastening member means 240 for securing respective opposite free ends of the cords 40c and 42c at or near respective corners of the window frame, is illustrated. This fastening member 240 includes an enlarged head portion 242 having an aperture 244 therethrough. A shank 246 with an enlarged bore 248 extends from this head 242 for insertion through a complementary receiving opening 249 in the window frame. In order to secure the fastening member to the window frame, an additional outwardly extending portion or extension 250 is provided for the head 242 and a further through bore or aperture 260 is formed in this extension 250 for receiving a fastener, such as threaded screw member 262 therethrough. This screw member 262 may be of a self-tapping type as illustrated to hold the fastening member 240 to the window frame. Of course, other forms of fasteners or fastening means may be utilized if desired without departing from the invention in this respect.

A spring 264 is disposed in the bore 248 and acts against an apertured disc 266 through which the cord extends to be knotted at an opposite surface thereof. This arrangement maintains the cord under tension so as to generally maintain the shade within the contours of the window frame during vehicle motion.

In the shade construction illustrated in FIGS. 19 through 22, end cap members 270 are utilized to close off respective ends of each of the headers. Each of these end caps 270 is substantially identical, including a pair of inwardly projecting leg members 272, 274 for grippingly engaging an interior portion of the channel forming its respective associated header member. However, the end caps associated with the top and bottom header members 34c and 38c are additionally provided with through apertures 276 which may further be provided with grommets 278 for guiding the respective cords 40c and 42c therethrough.

While particular embodiments of the invention have been shown and described, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A window shade construction for mounting adjacent a window frame comprising: a top header and a bottom header, a first pleated shade member having one end thereof coupled to said top header; a second pleated shade member having one end thereof coupled to an opposite end of said first shade member; cord means operatively coupled to said first and second shade members allowing selective movement of either or both of said first and second shade members between a fully collapsed position and a fully extended position relative to said window frame; wherein said cord means comprise a pair of cords located generally at opposite lateral sides of said shade construction and extending from said top header to said bottom header; a middle header comprising a generally hollow elongate member having a through apertures for receiving said cords therethrough; said top header being coupled to a top portion of said window frame and said bottom header being coupled to a bottom portion of said window frame; and mounting means for mounting said pair of cords to said middle header for slidable, frictional engagement therewith so as to permit said middle header to be set in any desired orientation along said cords relative to the window to thereby hold said first and second pleated shade members in corresponding positions relative to the window frame.

2. A shade construction according to claim 1 wherein said mounting means comprises respective through apertures formed in respective upper and lower surfaces of said middle header and in alignment with the through apertures in said pleated shade members, said cords being directed through one of said through apertures in a first lateral side of the top surface thereof and through the hollow interior thereof to the one of said through apertures in an opposite lateral side thereof to thereby define said frictional engagement between said middle header and said cords.

3. A window shade construction for mounting adjacent a window frame comprising: a top header and a bottom header, a first pleated shade member having one end thereof coupled to said top header; a second pleated shade member having one end thereof coupled to an opposite end of said first shade member; cord means operatively coupled to said first and second shade members allowing selective movement of either or both of said first and second shade members between a fully collapsed position and a fully extended position relative to said window frame; wherein said cord means comprise a pair of flexible cords extending generally from a top portion to a bottom portion of said window frame adjacent opposite lateral sides thereof, a middle header coupled intermediate said second pleated shade member one end and said opposite end of said first shade member; and wherein said top, middle and bottom headers are slidably, frictionally engaged with said cords, so as to permit slidable movement of each of said headers to any desired position along said cords and corresponding positioning of the first and second pleated shade members relative to said window for fully extending or collapsing either or both of said pleated shade members relative to said window frame.

4. A shade construction according to claim 3 wherein each of said headers comprises an elongate, hollow, open-ended member, and wherein cord mounting means are provided on each header, said cord mounting means comprising an end cap affixed to either end of each of said top and bottom headers, each said end cap having a through aperture for receiving one of said cords therethrough from the respective adjacent top or bottom portion of said window frame.

5. A shade construction according to claim 4 wherein said mounting means further comprises respective through apertures formed in respective surfaces of each of said headers in alignment with and facing the through apertures in the respective pleated shade members, said cords being directed through one of said through apertures at a first lateral side of each header and crossed over through the hollow interior thereof to the one of said through apertures of the end cap or surface respectively, in an opposite lateral side of the same header to thereby define frictional engagement between each said header and said cords.

* * * * *